(12) United States Patent
Chun (10) Patent No.: US 10,552,503 B2
(45) Date of Patent: Feb. 4, 2020

(54) CONTENT EVALUATION METHOD AND SERVER IN NETWORK ENVIRONMENT

(71) Applicant: Jong Yoon Chun, Seoul (KR)

(72) Inventor: Sol Jee Chun, Seoul (KR)

(73) Assignee: Jong Yoon Chun (KR)

( * ) Notice: Subject to any disclaimer, the term of this patent is extended or adjusted under 35 U.S.C. 154(b) by 108 days.

(21) Appl. No.: 15/532,051

(22) PCT Filed: Dec. 4, 2015

(86) PCT No.: PCT/KR2015/013276
§ 371 (c)(1),
(2) Date: May 31, 2017

(87) PCT Pub. No.: WO2016/089179
PCT Pub. Date: Jun. 9, 2016

(65) Prior Publication Data
US 2017/0300583 A1     Oct. 19, 2017

(30) Foreign Application Priority Data

Dec. 5, 2014   (KR) .......................... 10-2014-0173760

(51) Int. Cl.
*G06F 16/95*    (2019.01)
*G06F 16/9535*  (2019.01)
*G06F 16/48*    (2019.01)
*G06Q 50/10*    (2012.01)
*G06Q 10/00*    (2012.01)

(52) U.S. Cl.
CPC .......... *G06F 16/9535* (2019.01); *G06F 16/48* (2019.01); *G06Q 10/00* (2013.01); *G06Q 50/10* (2013.01); *G06F 16/95* (2019.01)

(58) Field of Classification Search
None
See application file for complete search history.

(56) References Cited

U.S. PATENT DOCUMENTS

| 8,195,522 B1 | 6/2012 | Sonne | 705/26.2 |
| 8,554,601 B1 * | 10/2013 | Marsh | G06Q 30/0278 705/7.32 |

(Continued)

FOREIGN PATENT DOCUMENTS

| JP | 2004-139343 | 5/2004 | G06F 17/60 |
| JP | 2010-61183 | 3/2010 | G06F 17/30 |

(Continued)

OTHER PUBLICATIONS

PCT International Search Report and Written Opinion for Corresponding International Application PCT/KR2015/013276 dated Mar. 28, 2016 (10 Pages).

(Continued)

*Primary Examiner* — Joshua Joo
(74) *Attorney, Agent, or Firm* — Hayes Soloway P.C.

(57) ABSTRACT

The present invention relates to a content evaluation method and a content evaluation server in a network environment. The present invention compares a content tag of an applicant with an evaluator tag for evaluating contents such that contents may be evaluated by an evaluator in accordance with the content tag, ensuring a more reliable evaluation through content evaluation by suitable evaluators.

10 Claims, 3 Drawing Sheets

(56) References Cited

U.S. PATENT DOCUMENTS

| | | | |
|---|---|---|---|
| 2002/0032776 A1 | 3/2002 | Hasegawa et al. | 709/225 |
| 2005/0283396 A1* | 12/2005 | Rhodes | G06Q 10/0631 705/7.14 |
| 2006/0047615 A1* | 3/2006 | Ravin | G06N 5/022 706/50 |
| 2007/0156507 A1* | 7/2007 | Connelly | G06Q 30/0203 705/7.32 |
| 2007/0186230 A1* | 8/2007 | Foroutan | G06Q 10/0631 725/24 |
| 2008/0004946 A1* | 1/2008 | Schwarz | G06Q 10/10 705/12 |
| 2008/0320568 A1 | 12/2008 | Hawkins et al. | 726/5 |
| 2010/0058377 A1 | 3/2010 | Grob et al. | 725/14 |
| 2010/0121650 A1* | 5/2010 | Hughes | G06Q 30/02 705/1.1 |
| 2010/0262610 A1* | 10/2010 | Acosta | G06F 16/3334 707/748 |
| 2011/0125861 A1* | 5/2011 | Evans | H04L 67/1072 709/206 |
| 2012/0290494 A1* | 11/2012 | Haimovitz | G06Q 10/1053 705/321 |
| 2014/0259070 A1* | 9/2014 | Angiolillo | H04N 5/4403 725/44 |
| 2014/0278873 A1 | 9/2014 | Shimizu et al. | 705/14.19 |
| 2015/0127127 A1* | 5/2015 | Carpenter | G06Q 30/0631 700/92 |

FOREIGN PATENT DOCUMENTS

| | | | |
|---|---|---|---|
| KR | 20000054662 | 9/2000 | G06F 19/00 |
| KR | 20090000286 | 1/2009 | G06Q 30/00 |
| KR | 20090120633 | 11/2009 | G06Q 50/00 |
| KR | 20110057822 | 6/2011 | G06Q 30/00 |
| KR | 20130128145 | 11/2013 | G06Q 30/06 |
| KR | 20140096411 | 8/2014 | G06F 17/00 |
| WO | WO2002/091259 | 11/2002 | G06F 17/60 |

OTHER PUBLICATIONS

European Search Report from related European Patent Application Serial No. 15864504.4, dated Mar. 21, 2018, (7 pages).
Notice of Reasons for Refusal of related Japanese Application Serial No. 2017-549155, dated Apr. 17, 2018 (4 pages).

* cited by examiner

CONTENT EVALUATION METHOD AND SERVER IN NETWORK ENVIRONMENT

TECHNICAL FIELD

The present invention relates to a content evaluation method and a content evaluation server in a network environment.

BACKGROUND ART

The public has made an effort for a long time to become a singer or actor who may win popularity from the public. In order to become such a singer or actor, they may get an audition that is promoted by a production company for a drama and movie to get a chance.

Evaluation for a typical audition has been done by a few designated persons or specialists.

In recent, the public is actively getting an audition to become the singer or actor. Audition programs are winning popularity through media, such as TV with the growth of pop culture and there are many cases where the public debut as singers or actors through the audition programs.

Moreover, since typical TV audition programs need to produce new content in each evaluation stage and provide new content in each evaluation stage to be judged, there are limitations in time and cost in order to produce several contents.

Typical TV audition programs limitatively enable the public to participate in content evaluation and thus, results of evaluation received from the public are also applied limitatively.

Korea Patent Publication No. 10-2000-0054662 (published on Sep. 5, 2000) relates to 'AUDITION THROUGH INTERNET AND KARAOKE AND MANAGEMENT METHOD THEREOF'. When an audition video containing a performance performed in affiliated karaoke is registered on an internet website, evaluation of audition video is performed by evaluators including netizen and special judging panels. A scouter for an entertainment company may scout a corresponding audition participant according to evaluation of audition video.

However, the final purpose of the related art is to scout a professional entertainer and thus there is a problem in that there is a need for special judging panels. Also, since the special judging panels for audition judgment are selected according to the arbitrary criterion of a corresponding audition organization, there is a problem in that there is a lack of objectivity of the evaluation result from the arbitrarily selected special judging panel.

In another prior art, the netizen may also participate in typical online audition programs as an evaluator without considering their specialty or interest on category of audition contents. In this case, there is a problem that the netizen evaluator lacks specialty or interest on evaluated contents. This kind of prior art includes not only online audition system but also contents bulletin service or contents sharing service such as YouTube.

DISCLOSURE OF INVENTION

Technical Problem

In order to solve technical problem as described above, it is an object of the present invention to provide a content evaluation method using a content evaluation server in a network environment.

It is another object of the present invention to provide a content evaluation server for performing content evaluation in a network environment.

Solution to Problem

In one aspect of this invention, there is provided a content evaluation method using a content evaluation server in a network environment, comprising: (a) receiving a content and a content tag from a terminal and storing the content and the content tag; wherein the content comprises an evaluator selection information including an evaluation stage information; (b) comparing the content tag with evaluator tags of evaluators, wherein each of the evaluator tags comprises an information of an evaluator level corresponding to an evaluation stage information, and selecting an evaluator having the information of the evaluator level in accordance with the evaluator selection information; (c) receiving an evaluation result of the content evaluated by the selected evaluator from an evaluator terminal; and (d) determining whether the content is selected by using the evaluation result of the content.

In another aspect of this invention, there is provided a content evaluation server for performing a process for evaluating a content in a network environment, comprising: an evaluation performing unit for (i) comparing a content tag comprising an evaluator selection information with an evaluator tag comprising an information of an evaluator level to select an evaluator having the information of the evaluator level in accordance with the evaluator selection information; wherein the evaluator selection information includes an evaluation stage information; and (ii) determining whether the content is selected by using an evaluation result of the content evaluated by the selected evaluator; and a content evaluation database (DB) for performing at least one of receiving and storing the content and the content tag from a terminal, storing the evaluator tag and receiving and storing the evaluation result by the selected evaluator.

Advantageous Effects of Invention

The features and advantages of this invention are summarized as follows:

The content evaluation server in a network environment and the content evaluation method using the same of the present invention show contents created by the public through the internet and enable the public to evaluate corresponding contents, thereby reducing total amount of time and system resource for evaluation of numerous contents to be evaluated The present invention compares a content tag of an applicant with an evaluator tag for evaluating contents such that contents may be evaluated by an evaluator in accordance with the content tag, ensuring a more reliable evaluation through content evaluation by suitable evaluators.

As the present invention adjusts a range for further selecting evaluators based on a matching rate among evaluators selected by comparison of the content tag with the evaluator tag, addressing that the number of evaluators participating in evaluation may be suitably adjusted.

As the present invention performs evaluation in each evaluation stage by using the first-created same content, time and cost for creating a plurality of contents may be reduced.

The present invention may enable different evaluators to perform evaluation in each evaluation stage. Thus, the present invention may prevent the repetitive evaluation of the same content by evaluators and therefore enhancing the objectivity of evaluation.

The present invention may permit evaluators formed by ordinary people rather than experts to evaluate contents. The content evaluation experience of such evaluators including the evaluation frequency and quality may be used as one of determining factors for evaluator levels, significantly enhancing the fairness and objectivity of the content evaluation method of this invention.

As the present invention may raise evaluator levels based on evaluator scores (evaluation quality, evaluation frequency, etc.) generated by content evaluation by evaluators, the fair evaluation of contents is ensured voluntarily by evaluators for elevation of their evaluator levels.

The present invention may classify evaluators in a certain evaluator level into a plurality of groups, permitting contents to be distributed into each group. Also, since the number of contents to be evaluated by evaluators in each group is limited, the content evaluation may be performed more efficiently and rapidly.

As evaluators who are the public having various jobs, specialties and majors may participate in the content evaluation, any type or genre of contents may be evaluated by the present invention.

MODE FOR THE INVENTION

The terms or words used in the detailed description and claims should not be limitedly construed as typical meanings or meanings indicated in dictionaries but should be construed as meanings and concepts matching the technical spirit of the present invention based on the principle that the inventor may properly define the concepts of terms in order to describe his or her invention in the best mode.

Thus, since embodiments described in the detailed description and configurations shown in the drawings are only examples and do not cover all the technical spirits of an embodiment, it should be understood that there may be various equivalents and variations that may replace them upon filing the present application.

Furthermore, when it is described in the detailed description that an element comprises (or includes or has) some elements, it should be understood that it may comprise (or include or has) only those elements, or it may comprise (or include or have) other elements as well as those elements if there is no specific limitation. Also, the term 'module', 'unit', 'server' or 'system' in the detailed description means a unit of processing at least one function or operation, and they may be implemented in software, hardware, or a combination thereof and included in a single device or in different devices.

As used herein, the singular forms "a", "an" and "the" are intended to include the plural forms as well, unless the context clearly indicates otherwise.

In the following, exemplary embodiments of the present invention are described in detail.

Figure 1:
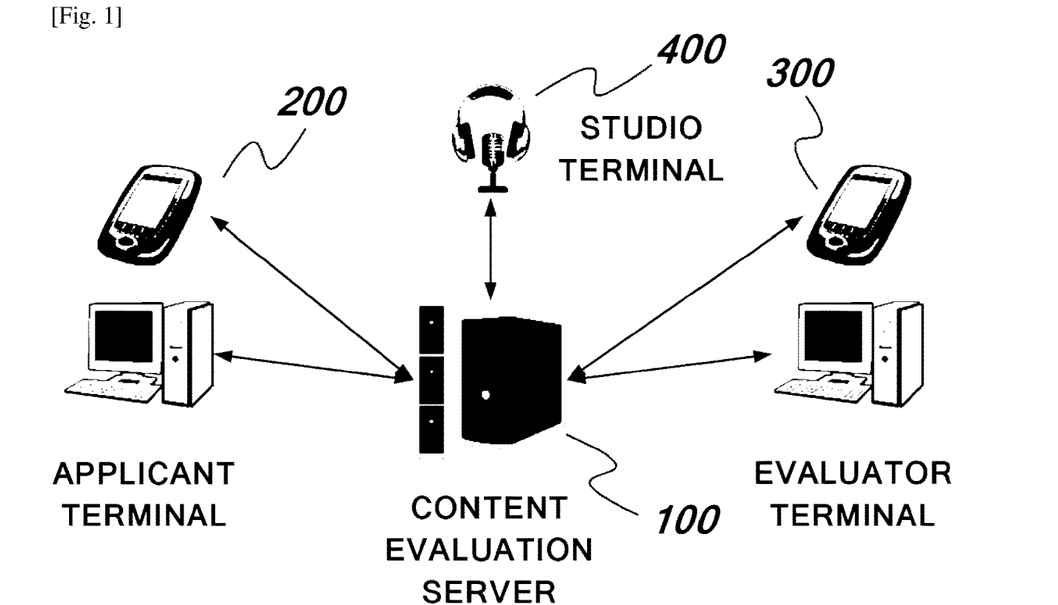
FIG. 1 is a general configuration diagram for representing a content evaluation system according to an embodiment of the present invention.
Figure 2:
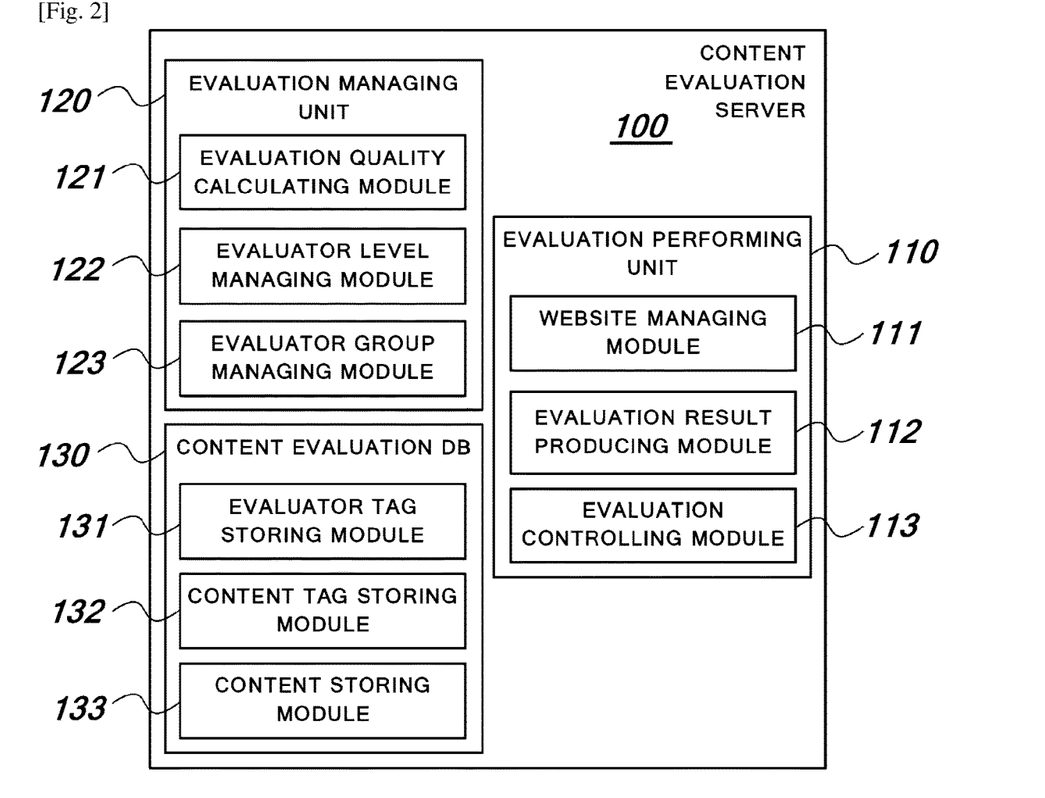
FIG. 2 is a block diagram for representing a content evaluation server according to an embodiment of the present invention.

FIG. 1 is a general configuration diagram for representing a content evaluation system according to the present invention, and FIG. 2 is a block diagram for representing a content evaluation server according to the present invention. As shown in FIG. 1, the content evaluation system includes a content evaluation server 100 for performing a content evaluation, an applicant terminal 200 for applying a content evaluation, an evaluator terminal 300 for evaluating a content posted on the website of the content evaluation server 100, and a studio terminal 400 for creating a content by the request of an applicant.

As shown in FIG. 2, the content evaluation server 100 includes an evaluation performing unit 110 that performs a content evaluation according to a content evaluation procedure, an evaluation managing unit 120 that manages evaluators and evaluation results, and a content evaluation DB 130 that stores a content and a content tag.

The evaluation performing unit 110 includes a website managing module 111 connected to the internet for managing websites that post contents, an evaluation result producing module 112 that produces an integrated evaluation results by using the evaluation results transmitted by the evaluator terminal 300 who has evaluated contents posted, and an evaluation controlling module 113 that performs evaluation on stored contents transmitted by the applicant terminal 200 and the studio terminal 400 and then determines whether to select evaluated contents by the integrated evaluation results produced by using the evaluation results received from the evaluator terminal 300.

The website managing module 111 posts a content to be evaluated under the control of the evaluation control module 113 when a content to be evaluated is selected among contents stored in the content evaluation DB 130. The terminals that are possessed by applicants, evaluators, users and netizens joined as members may connect to the website through the internet. The website may provide downloading and streaming services to the terminals requesting the posted content in response to the requests of the applicants, evaluators, users and netizens.

Furthermore, the website managing module 111 receives preference results that include (i) a playing frequency of the content at user and netizen terminals and (ii) a favor response for the content input from user and netizen terminals. Then, the website managing module 111 delivers the received preference results to the evaluation result producing module 112. The favor response may be optionally input for showing appreciation results of the content, for example, clicking icons such as "good" and "like".

The website managing module 111 may enable the content for evaluation to be posted on a website for a certain period of time according to a content post period command so that an evaluator may evaluate the content, and stop posting the evaluated content after the period. Where necessary, the content evaluation may be prevented while the content is continuously posted on the website.

The content evaluation server 100 receives an evaluation result from the evaluator terminal 300 that evaluates the content, and stores the received evaluation result in the content evaluation DB 130. In particular, at least one evaluator terminal 300 evaluates the content corresponding to a evaluator level, produces and transmits an evaluation result to the content evaluation server 100, the content evaluation server 100 receives and stores the evaluation result in the content evaluation DB 130.

The evaluation result producing module 112 collects evaluation results stored in the content evaluation DB 130 after completion of the content evaluation, and produces an integrated evaluation result by using the evaluation result and a preference result including (i) a playing frequency of the content posted on the website, (ii) favor response for the content transmitted by each terminal of users and netizen and (iii) the number of evaluators having evaluated the content. Then, the evaluation result producing module 112 transmits the integrated evaluation result to the website managing module 111 for posting the integrated evaluation result on the website.

The evaluation controlling module 113 controls the operation of the content evaluation server 100 such that the content may be evaluated by evaluators according to the evaluation procedure of the present invention. The evaluation controlling module 113 delivers a content to be evaluated among at least one content stored in the content storing module 133 to the website managing module 111 such that the contents is posted. And the evaluation controlling module 113 controls the website managing module 111 to end the evaluation of the content to be evaluated as an evaluation period ends.

Furthermore, the evaluation controlling module 113 compares the content tag of the content stored in a content tag storing module 132, with evaluator tags stored in an evaluator tag storing module 131, thereby selecting evaluators. In other words, the evaluation controlling module 113 may select an evaluator having an information of an evaluator level in accordance with the evaluator selection information according to the evaluation procedure by using the evaluator selection information (particularly, the evaluation stage information) among a plurality of information in the content tag, followed by evaluating the content by the selected evaluator.

Among a plurality of information contained in the content tags, the evaluator selection information (particularly, the evaluation stage information) is used for selection of evaluator. An example of the evaluation stage information may be an evaluator level to evaluate contents or a content evaluation stage. The evaluator level for an evaluation stage may be determined according to policy of the evaluation procedure of the present invention.

The evaluator tag includes an information of an evaluator level corresponding to an evaluation stage information. Therefore, an evaluator having the information of the evaluator level in accordance with the evaluator selection information may be selected by using both the content tag and the evaluator tag.

The evaluators may be classified into at least two levels depending on expertness grades of evaluators (i.e., professionality of evaluation), region levels (e.g., levels of administrative district) or age. Also, hierarchically classified evaluator tags among evaluator tags may be set as the evaluator levels. For example, in the case of a company, evaluator levels may be classified into a team, a division, a unit, and headquarter, and in the case of a university, evaluator levels may be classified into a department, the faculty, a college, and a university.

In an embodiment, where evaluator levels are classified according to the hierarchy of a company, the team being the lowest level of the company may be classified into a purchasing team, a product development team and so on, the division being the second lowest level of the company may be classified into a management and plan division, a research and development division, a product support division and so on, the department being the third lowest level of the company may be classified into a domestic department, a foreign department, a management support department and so on, and the highest level (top) of the company may be the headquarter.

Where the evaluator level is applied to the university, classified groups are as follows: The department being the lowest level of the university may be classified into a department of biotechnology, Korean language and literature, computer engineering and so on, the college being the second lowest level of the university may be classified into an engineering college, a college of liberal arts, a college of natural science, a college of medicine and so on, and the highest level (top) of the university may be the university.

The evaluator selection information comprising the evaluation stage information is compared with the evaluator tags and then an evaluator having the information of the evaluator level in accordance with the evaluator selection information is selected, enabling that all evaluators having the information of the evaluator level selected performs the content evaluation.

The evaluators for evaluating contents may be further selected within an evaluator level. For example, the evaluators may be selected by comparing the evaluation selection information with the evaluator tags of evaluators and calculating a matching rate between them, after which an evaluator having desirable matching rate is finally selected as the evaluators.

For example, in the case that evaluator levels according to an evaluation stage are classified by age (e.g., the teens, the twenties and the thirties, the evaluation stage information for a certain evaluation stage in the content tag may be that 'the age of the evaluator is 27'. In such case, the evaluator level for the content is determined to be the 'twenties' and evaluators having the evaluator level of the 'twenties' are selected. By using the matching rate between the evaluation stage information ('the age of an evaluator is 27') and evaluator tags, evaluators may be selected depending on a matching rate among evaluators having an evaluator level being the 'twenties'.

Where the evaluator selection information indicates that 'the age of an evaluator is 27', evaluators whose ages are '27' are assigned a matching rate of 100, evaluators whose ages are '26' or '28' are assigned a matching rate of 80, evaluators whose ages are '25' or '29' are assigned a matching rate of 60, evaluators whose ages are '24' are assigned a matching rate of 40, and evaluators whose ages are '23' are assigned a matching rate of 20.

Afterwards, when evaluators having a matching rate equal to or higher than 70 are selected, '27-year-old' evaluators having a matching rate of 100 and '26-year-old and 28-year old' evaluators having a matching rate of 80 may be selected. In such case, the matching rate of 70 may be set by an applicant or by the evaluation performing unit 110 according to the evaluation procedure of the content evaluation server 100.

The evaluator selection information in the content tag may comprise an evaluation stage for content evaluation, a preferred evaluator level, an applicant's age, gender, region, hobby, specialty, religion, job family, job, company, blood ties, graduated college, birthplace, party, SNS, contact information and content genre. One or more of the evaluator selection information is used as the evaluation stage information It is possible to select evaluators by comparing evaluator tags with the evaluation stage information and at least one additional feature information for evaluator selection.

In particular, when an applicant inputs a content tag through the applicant terminal 200, the applicant inputs an evaluator selection information with his or her priority and then the evaluator selection information input is contained in the content tag. Afterwards, the content evaluation server 100 compares at least a piece of the evaluator selection information in the content tag with evaluator tags in accordance with the priority for selecting evaluators. Therefore, the applicant may permit to select evaluators in accordance with the applicant's intention by selecting evaluators compatible with an evaluator selection information.

The additional feature information for evaluator selection other than the evaluation stage information in the evaluator selection information of the content tags may include social relation information of the applicant. The social relation information includes, but not limited to applicant's job family, job, a company, blood ties, graduated college, birthplace, party, SNS and contact information.

For example, where the evaluation stage information is a region information and the additional feature information is a job (e.g., lawyer), evaluators having the region level corresponding to the region information may be selected and then evaluators whose jobs are 'lawyers' may specifically selected among the evaluators previously selected.

Where the additional feature information is a 'company', the employees of an applicant's company may be selected as evaluators among evaluators having same evaluator level information (region level).

Where the additional feature information is 'SNS', users connected to an applicant's SNS may be selected as evaluators.

Where the additional feature information is the 'age', users being the same age as the 'age' of the feature information may be selected as evaluators among evaluators having the information of the evaluator level.

Where the additional feature information is the 'age' and the 'gender', users being the same gender and age as the 'gender' and 'age' of the feature information may be selected as evaluators among evaluators having the information of the evaluator level.

Figure 4:
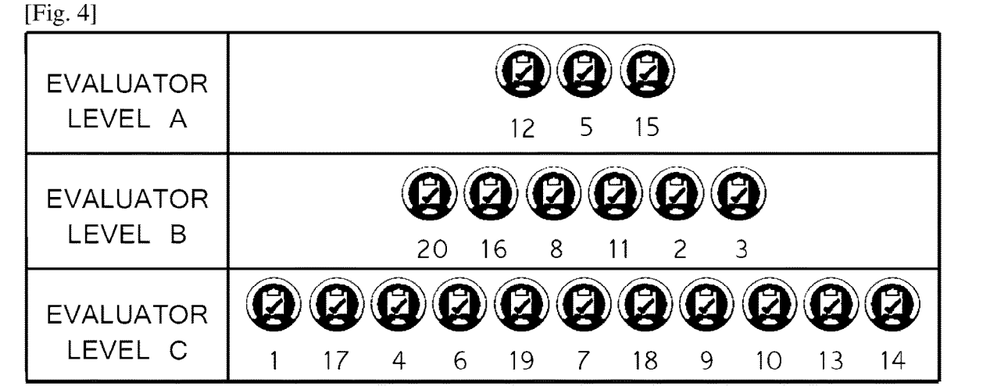
FIG. 4 is an exemplary diagram for representing an evaluator level according to an embodiment of the present invention.

For example, where the evaluator selection information (particularly, evaluation stage information) in the content tag is a 'first evaluation stage' and the additional feature information is that 'the age of an evaluator is the twenties', evaluators in accordance with the two types of information are selected for performing the content evaluation. Evaluators satisfying both an evaluator level C evaluating the 'first evaluation stage' and the age of an evaluator of the twenties may be selected for performing the content evaluation, as shown in FIG. 4.

In the case that evaluators are selected by two types of the evaluator selection information as described above, the two information are compared with an evaluator tag and evaluators may be selected based on a matching rate of the at least one of two information.

For example, evaluator selection information are 'the first evaluation stage' and 'the age of the twenties', the evaluator will be selected by using information of 'the first evaluation stage', then further selected by the matching rate of 'the age of the twenties' with the evaluator tag.

Where a plurality of evaluator selection information is used, an example of the matching rate is to use the number of evaluator tags being coincident with the evaluator selection information. For example, in the case that five pieces of evaluator selection information are used and coincident with evaluator tags, the matching rate may be expressed as 5. Alternatively, the matching rate may be determined by similarity or closeness instead of coincidence. A portion of all evaluator selection information may be used for calculating the matching rate.

Furthermore, the evaluation controlling module 113 analyzes an evaluation result produced by the evaluation result producing module 112 and determines whether to select the content. In the case that the content is selected, the evaluation controlling module 113 may determine whether there is the next higher evaluator level than the evaluator level of the evaluator level information of the selected evaluator who has evaluated the content. When there is the next higher evaluator level, the evaluation controlling module 113 controls the website managing module 111 to post the selected content such that the selected content may be evaluated by the next higher evaluator level.

According to an embodiment, where the evaluation result satisfies a criterion determined by a threshold value or threshold ranking set by the content evaluation server 100, it is determined that the content is selected for the corresponding evaluator level. Where the evaluation result does not satisfy the criterion, it is determined that the content is not selected for the corresponding evaluator level.

In particular, where a content selection criterion is a threshold ranking, contents from a plurality of applicants are evaluated by evaluators having the same evaluator level and the evaluation results of the contents are compared, and then it is determined that contents from the highest ranking to a corresponding 'threshold ranking' are selected by evaluations of a corresponding evaluator level.

Where the content selection criterion is a threshold value, a content from at least one applicant is evaluated by evaluators having the same evaluator level and the evaluation results of the content are compared, and then it is determined that the content is selected by the evaluation of a corresponding evaluator level when the evaluation result is equal to or higher than the threshold value (e.g., predetermined score).

In such case, when the content is selected in the evaluator level and there is the next higher evaluator level, the evaluation stage information in the content tag of the selected content is updated such that the selected content may be evaluated by evaluators having the next higher evaluator level.

For example, as shown in FIG. 4, the 'first evaluation' of a content is applied, an evaluation is performed by the 'evaluator level C' and the content is selected. There is the 'evaluator level B' being the next higher evaluator level. The evaluation stage information is updated from the 'first evaluation' to 'second evaluation' such that the content may be evaluated by the 'evaluator level B' being the next higher evaluator level.

According to an embodiment of the present invention, only a single evaluator level among a plurality of evaluator levels is assigned to an evaluator and the evaluator performs evaluation only in an evaluation stage that may evaluate with the corresponding evaluator level. According to an embodiment of the present invention, an evaluator selected in each evaluation stage performs evaluation once in a corresponding evaluation stage and a content is evaluated once by the evaluator having the selected evaluator level.

In another embodiment of the present invention, evaluation may also be performed by evaluators belonging to the higher evaluator level when the content is in lower evaluation stage corresponding to a lower evaluator level.

In an embodiment of the present invention, the evaluator may be selected by using at least one of the additional feature information as well as the evaluation stage information. Evaluators having a corresponding evaluator level are firstly selected by using the evaluation stage information. Among the firstly selected evaluators, evaluators in accordance with at least one of the additional feature information are further selected. Alternatively, evaluators in accordance with at least one of the additional feature information are first selected and then evaluators having a corresponding evaluator level are selected by using the evaluation stage information.

Furthermore, the evaluation control unit 113 may deliver, to the evaluator level managing module 122, an evaluator score of evaluator tags stored in the evaluator tag storing module 131 in the content evaluation DB 130 such that the evaluator level managing module 122 may adjust the evaluator level of each evaluator.

When any of evaluator selection information in the content tags is not input by an applicant, the content evaluation server 100 may input missing information. In this case, the input information may be preset by the content evaluation server 100 according to an evaluation procedure.

The evaluation managing unit 120 includes an evaluation quality calculating module 121 that calculates the evaluation quality of evaluators who have evaluated contents, an evaluator level managing module 122 that adjusts an evaluator level by using the evaluation quality and the evaluation frequency of evaluators, and an evaluator group managing module 123 that manages groups of evaluators by forming a group with the same evaluator level among evaluators classified into a plurality of levels.

The evaluation quality calculating module 121 compares the evaluation result from one evaluator with the entire evaluation results from evaluators having same evaluator level for determining an evaluation quality. In particular, when an evaluation result from one evaluator is the same as or similar to the entire evaluation result from evaluators having same evaluator level, the evaluation quality may be determined to be good. When the evaluation result is significantly different from the entire evaluation result from evaluators having same evaluator level, the evaluation quality may be determined to be bad.

As a result, the evaluation quality of an evaluator calculated by the evaluation quality calculating module 121 may sufficiently reflects substantial quality of an evaluator. If the evaluator intentionally gives unfair evaluation result, then the evaluation quality calculating module 121 shall give a penalty to the evaluator such as lowering his or her evaluator level. On the contrary, if the evaluator gives fair evaluation result, then the evaluation quality calculating module 121 shall give incentive such as raising his or her evaluator level.

The evaluation quality calculating module 121 calculates the evaluation quality of each evaluator and stores the measured evaluation quality in the evaluator tag storing module 131 in the content evaluation DB 130. Then, the evaluation quality may be reflected to an evaluator score when the evaluator level of each evaluator is re-adjusted by the evaluator level managing module 122.

The evaluator level managing module 122 manages an evaluator level by using information such as the evaluation quality and the evaluation frequency of each evaluator calculated by the evaluation quality calculating module 121.

The evaluator level may be classified into two or more levels. The evaluator who has newly joined may be assigned the lowest level. The evaluator level may be raised to the next higher evaluator level based on the evaluator score that is calculated by using the evaluation frequency and/or the evaluation quality.

The evaluator level managed by the evaluator level managing module 122 may be raised to the next higher evaluator level upon increase in evaluator score. Furthermore, the evaluator level may be lowered to the next lower evaluator level when an evaluator score decreases due to reasons such as a decrease in evaluation quality.

The number of evaluator levels may be adjusted and set according to the number of users registered as evaluators among users who have joined as members. For example, where the evaluator levels are set in units of 1,000 people according to the number of evaluators, 10 evaluator levels and 100 evaluator levels may be set when the number of all registered evaluators is 10,000 and 100,000, respectively.

Where the evaluator levels are set to 5 levels, the number of evaluators for each evaluator level is set with a ratio and thus the lowest evaluator level to the highest evaluator level are set to 40%, 30%, 15%, 10% and 5%, the number of evaluators within an evaluator level is set to 4,000, 3,000, 1,500 and 500 when the number of all evaluators is 10,000, and to 40,000, 30,000, 10,000, 5,000 when the number of all evaluators is 100,000.

The evaluator group managing module 123 classifies each evaluator level into groups and the groups may relate to information in an evaluator tag respectively. The group may be formed in terms of a region at which evaluators have registered, the age, gender, a hobby, specialty, a religion, a job family, a job, a company, blood ties, a graduated college, a birthplace, a party, SNS, contact information and preferred content genre.

The group may be set by at least one additional feature information other than evaluation stage information of a content tag.

For example, where a group of evaluators are generated based on region, it may be formed based on administrative districts such as Cheongdam-dong, Samseong-dong or Yeoksam-dong in Gangnam-gu.

In the case that a group of evaluators is generated based on a type of preferred content, it may be formed based on contents such as songs, performance and magic.

Furthermore, a boundary of a group of evaluators may vary by each evaluator level.

Furthermore, a group of evaluators may be generated in association with evaluator levels. A group generated within each evaluator level may vary in level, boundary or size according to an evaluator level.

For example, where a group is generated based on region in South Korea, a group generated in a lower evaluator level may be generated based on the "dong" (smallest metropolitan administrative unit in Korea) of administrative districts such as Cheongdam-dong, Samseong-dong, Seocho-dong and Banpo-dong and a group generated in a higher evaluator level (region level) may be generated based on the "gu" (second smallest metropolitan administrative unit in Korea) of administrative districts such as Gangnam-gu, Seocho-gu and Songpa-gu. Where there is the next higher evaluator level (region level) of the higher evaluator level, a group may be generated based on the city of the next higher administrative districts such as Seoulspecial city, Daejeon-metropolitan city and Incheon-metropolitan city. Where there is the highest evaluator level (region grade), a group may be generated as a nationwide region.

In this case, the 'dong' has the same level as 'eup, myeon', the 'gu' (rural administrative units in Korea) has the same level as 'city, gun', and 'city' has the same level as 'do, metropolitan city, special city'.

In the case of generating a group based on a region in the U.S., a group in the lower evaluator level may be generated based on the city of administrative districts, and a group in the higher evaluator level (region level) may be generated based on the county of higher administrative districts. The next higher evaluator level (region level) of the country may be the state, and the next higher evaluator level (region level) of the state may be generated based on the federation.

The units of the administrative districts are merely examples and the criterion of the region may vary depending on conditions such as the population and area of an administrative district and a certain radius from a specific location. Also, the region may be selected by information on an evaluator tag input when users have joined as evaluators, and may be selected by using residence address as needed.

A group setting according to the region may be set as zones that may divide the region by a logical criterion and a physical criterion, or may be set as zones within a certain radius from a specific point.

The content evaluation DB 130 includes the evaluator tag storing module 131 that stores evaluator tags as information on evaluators, the content tag storing module 132 that stores content tags including applicant information and content information, and the content storing module 133 that stores contents.

The evaluator tag storing module 131 includes evaluation information such as an evaluation result obtained by each evaluator, an evaluation frequency, and an evaluation quality, and stores information, such as an evaluator score, the evaluator level of each evaluator, and an evaluator group.

Furthermore, the evaluator tag storing module 131 stores information that includes basic information on evaluators such as evaluator's age, gender, region, address, preferred content types (songs, performance, magic, etc.) and preferred genres (ballad, hip-hop, rock, jazz, etc.) of content types.

The content tag storing module 132 may store information on applicants who requests for evaluation of contents, and information related to content application and evaluation. The applicant information includes a request frequency for content evaluation, an evaluation result of each content, an average evaluation result related to a level of contents applied for evaluation, an average evaluation result in terms of an evaluator level, a ranking in all applicants, and a selected evaluator level for each content.

Also, the content tag storing module 132 may store basic information on applicants, such as applicant's age (expressed by the teens, the twenties, the thirties, etc.), gender (male, female, etc.), region or address, preferred content types (songs, performance, magic, etc.) and preferred genres (ballad, hip-hop, rock, jazz, etc.) of content types.

The information related to the content application may include a content title, a content description (written by an applicant), content's type, format, genre, play time, file size, file extension, application date, created location (applicant terminal and studio terminal, etc.) and content-created date. The information related to the content evaluation may include a content evaluation stage, an evaluation result according to an evaluator level, an evaluation result according to an evaluator group, the number of evaluators who has evaluated contents, the best evaluation result, the worst evaluation result, the playing frequency of contents, content favor information, content evaluation comment and all rankings of evaluation results.

The content storing module 133 stores contents transmitted by terminals such as the applicant terminal 200 and the studio terminal 400. Particularly, the content storing module 133 may classify and store them according to content forms such as voice, image and document. Also, it is also possible to separately store classified contents according to content types and genres.

The applicant terminal 200 may include a personal computer (PC) and mobile terminal connected to the internet, and enable a user to connect to the website of the content evaluation server 100 to join as a member, apply for content evaluation and input content tags.

Where the applicant terminal 200 is the mobile terminal, users may download and install an application from the content evaluation server 100, and join as a member, register as a content applicant and apply for content evaluation by using the installed application.

Where the applicant terminal 200 includes equipment such as a camera capable of capturing an image and a microphone capable of recording voice, contents may be created by using the applicant terminal 200. The mobile terminal such as a smart phone and the PC including a basic equipment such as a camera and a microphone as well as the studio terminal 400 including various content creation equipments may create and transmit contents to the content evaluation server 100.

The evaluator terminal 300 may include a PC and mobile terminal connected to the internet, and enable a user to connect to the website of the content evaluation server 100 to join as a member and register as a content evaluator.

Where the evaluator terminal 300 is the mobile terminal, users may download and install an application from the content evaluation server 100, and join as a member, register as a content evaluator, input evaluator tags and input a content evaluation result by using the installed application.

The evaluator terminal 300 plays contents and transmits an evaluation result input from an evaluator to the content evaluation server 100.

The studio terminal 400 includes special equipment for creating contents such as a camera, microphone, recording facility, lighting, soundproof equipment, a sound reproducing system and devices processing computer graphic (CG) for a background image. Where an applicant creates contents by using the studio terminal 400, the studio terminal 400 may be reserved for use.

The studio terminal 400 creates contents by the reservation of the applicant, and after the studio terminal 400 performs processing such as editing on the created content, the processed content is transmitted to the content evaluation server 100 and stored. Background image editing on the created content may be processed by using equipment in the studio terminal 400 and may also be processed by the content evaluation server 100 to which content is transmitted, as needed.

Also, the studio terminal 400 may be singular or plural and in the latter case, they may be distributed in many regions.

Figure 3:
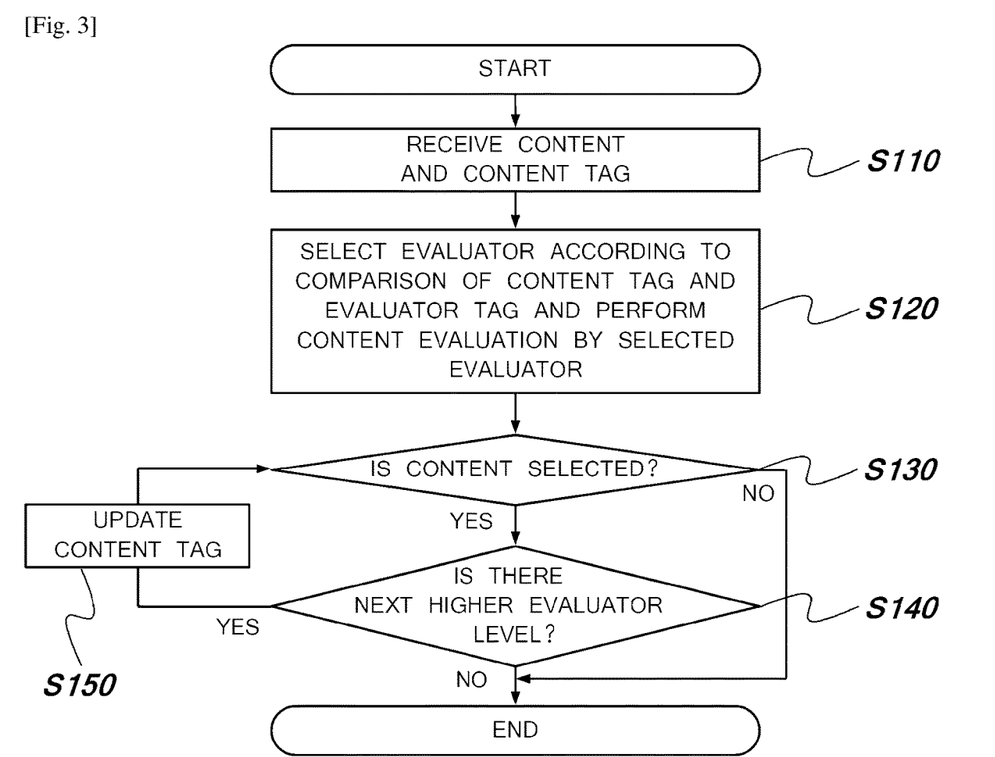
FIG. 3 is a flowchart of a content evaluation method according to an embodiment of the present invention.

FIG. 3 is a flowchart of a content evaluation method according to an embodiment of the present invention. As shown in FIG. 3, the content evaluation server 100 receives the content created and transmitted by the terminal such as the applicant terminal 200 and the studio terminal 400, stores the received content in the content storing module 133, and posts the content to be evaluated on the website according to a content evaluation procedure.

An applicant corresponds to a user registered as an applicant among users who has joined as members. The applicant terminal 200 connects to the website of the content evaluation server 100 through the internet to apply for content evaluation. Application for content evaluation is completed by the transmitting of content tags corresponding to content information and applicant information and the created content to the content evaluation server 100 and the receiving of content evaluation approval completion information transmitted by the content evaluation server 100. In this case, the content tags transmitted by the applicant terminal 200 are stored in the content tag storing module 132 of the content evaluation server 100.

The content evaluation application using the applicant terminal 200 may also be performed even when contents have not been created. After the content evaluation application is transmitted to the content evaluation server 100, contents may be created and in turn the content evaluation application is completed.

Contents may be created in various file formats such as a sound, image and document. The content evaluation server 100 classifies the received content to store the classified content in the content storing module 133 of the content evaluation DB 130. The classification of the content is performed in terms of various information such as file formats of the received content, details in the content and content evaluation applicants, and the classification information is included in content tags to be stored in the content tag storing module 132.

The evaluation controlling module 113 in the evaluation performing unit 110 of the content evaluation server 100 transmits a command to post contents to be evaluated among stored contents to the website managing module 111, and the website managing module 111 posts the contents to be evaluated on a website according to the transmitted command to post the contents.

After the contents are posted on the website, evaluators, users registered as members and netizen not registered as members may connect to the website of the content evaluation server 100 through their terminals, and consume the contents.

The evaluation controlling module 113 of the content evaluation server 100 compares the content tags of the content with evaluator tags for evaluating the content posted on the website, and selects evaluators having evaluator level information in accordance with the evaluation selection information (see S120, FIG. 3).

Where the first evaluation is performed on the content received by the content evaluation server 100, evaluators having evaluator levels that may evaluate the content among a plurality of evaluator levels stored in evaluator tags are selected by the evaluation controlling module 113 when the evaluation stage information of the evaluator selection information indicates the first evaluation stage.

The selected evaluators consume and evaluate the content posted on the website by using the evaluator terminal 300, and an evaluation result is transmitted to the content evaluation server 100.

Then, when content evaluation is ended according to the evaluation procedure, the content evaluation server 100 uses a total evaluation result produced from an evaluation result transmitted by the evaluator terminal 300 to determine whether the content is selected by a corresponding evaluator level (see S120, FIG. 3).

According to an embodiment, where the evaluation result is equal to or higher than a threshold value or ranking set by the content evaluation server 100, it is determined that content is selected by a corresponding evaluator level. Where the evaluation result is lower than the set threshold value or ranking, it is determined that the content is not selected by a corresponding evaluator level.

Where a content selection criterion is a threshold ranking, contents from a plurality of applicants are evaluated by evaluators having the same evaluator level, the evaluation results of the contents are compared, and it is determined that contents from the highest ranking to a corresponding threshold ranking are selected in the evaluations of a corresponding evaluator level. In the case that the content selection criterion is a threshold value, a content from at least one applicant is evaluated by evaluators having the same evaluator level, the evaluation results of the content are determined, and it is determined that the content is selected in the evaluation of a corresponding evaluator level when the evaluation result is equal to or higher than the threshold (e.g., predetermined score).

When the content is not selected in step S130 by a corresponding evaluator level, the content evaluation server 100 stops the evaluation procedure and displays the evaluation result of the evaluator level on the website, as needed. However, even when the content is selected in step S130 by the corresponding evaluator level, the evaluation result may be displayed on the website.

When the content is selected in step S130 by the corresponding evaluator level, the content evaluation server 140 determines whether there is the next higher evaluator level than the corresponding evaluator level (see S140, FIG. 3).

When there is the next higher evaluator level than the corresponding evaluator level, the evaluation controlling module 113 may update the evaluation stage information of the selected content in accordance with the next higher evaluator (step S150) and go to step S120 according to the content evaluation, enabling the content to be evaluated by evaluators having the next higher evaluator level.

Therefore, when there is the next higher evaluator level, the evaluation of the content may be performed by repeating steps S120 and S130. When the evaluator level is the highest level having no next higher evaluator level, the content evaluation server 100 ends an evaluation procedure for the content and displays, on the website, the evaluation result produced by the highest evaluator level, as needed.

FIG. 4 is an exemplary diagram for representing an evaluator level according to a first embodiment of the present invention. As shown in FIG. 4, each of users (evaluators 1 to 20) registered as evaluators among users who have joined as members are assigned a single evaluator level. The evaluator levels are classified into at least two levels. In the case that they are classified into three evaluator levels A to C as shown in FIG. 4, the evaluators that have newly joined as members are assigned the lowest evaluator level C.

An evaluator score for determining evaluator levels may be calculated in considering an evaluation frequency and evaluation quality. Where the accumulated evaluator score is equal to or higher than a certain score or ranking, the evaluator level of evaluators may be raised.

The evaluators 1, 17, 4, . . . , 14 having the evaluator level C in FIG. 4 are evaluators having the lowest evaluator level.

The evaluators 20, 16, 8, . . . , 3 having the evaluator level B in FIG. 4 are evaluators whose evaluator levels are raised from the evaluator level C, and evaluators 12, 5, and 15 having the evaluator level A are evaluators whose evaluator levels have been raised from the evaluator level B.

Thus, evaluators may be assigned levels A to C according to a content evaluation result. It is desirable to properly adjust the number of evaluators in each evaluator level such that the content of an applicant may be evaluated according to an evaluation procedure.

For example, since there are many applicants who apply for content evaluation but there is the limited or small number of contents that is selected by each evaluator level, the number of evaluators in evaluator levels may be set such that the higher level has less number of evaluators as represented in FIG. 4.

The number of evaluators for evaluator levels may be set and adjusted to have different ratios according to each evaluator level. The evaluators may be assigned with the evaluator level according to preset ratio of evaluator level.

Each evaluator level in the evaluator levels in FIG. 4 may be divided into groups by using information in evaluator tags. For example, where the regions of evaluators 1, 17 and 4 having the evaluator level C according to a region condition in information of evaluator tags are a 'a' region, the evaluators having the evaluator level C may be set to an evaluator level C-a region group. Also, the regions of evaluators 6, 19 and 7 having the evaluator level C are a 'b' region, the corresponding evaluators may be set to an evaluator level C-b region group. The regions of evaluators 18, 9 and 10 having the evaluator level C are a 'c' region, the corresponding evaluators may be set to an evaluator level C-c region group. The regions of evaluators 13 and 14 having the evaluator level C are a 'd' region, the corresponding evaluators may be set to an evaluator level C-d region group.

Next, where the next higher regions of the 'a' region and the 'b' region are an 'ab' region and the regions of evaluators 20, 16, and 8 having the evaluator level B are the 'ab' region, the corresponding evaluators may be set to an evaluator level B-ab region group.

Where the next higher regions of the 'c' region the 'd' region are a 'cd' region and the regions of evaluators 11, 2, and 3 having the evaluator level B are the 'cd' region, the corresponding evaluators may be set to an evaluator level B-cd region group.

Next, where the next higher regions of the 'ab' region and the 'cd' region are an 'abcd' region and the regions of evaluators 12, 5, and 15 having the evaluator level A are the 'abcd' region, the corresponding evaluators may be set to an evaluator level A-abcd region group.

As the evaluator level A is the highest of the classified groups, it may not be divided into a separate group.

Figure 5:
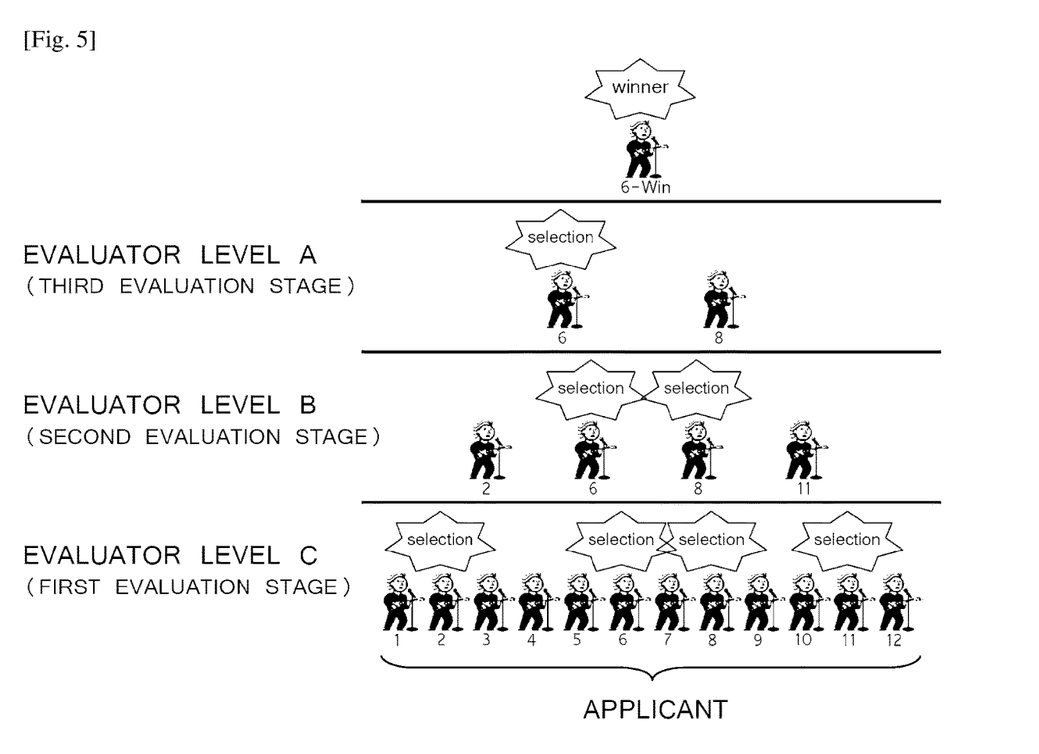
FIG. 5 is an exemplary diagram for representing content selection according to an embodiment of the present invention.

FIG. 5 is an exemplary diagram for representing the content selection according to an embodiment of the present invention. As shown in FIG. 5, where there are 12 applicants (applicants 1 to 12) who have requested content evaluation, a first evaluation stage is stored in the evaluator selection information among stored content tags of the applicants. By comparing evaluator selection information in content tags with evaluator tags, evaluators having the evaluator level C are selected for the first evaluation stage. Thus, the content from each applicant 1, 2, 3, . . . , 12 may be evaluated by evaluators having the first evaluator level C. Where contents from the applicants 2, 6, 8 and 11 are selected by the evaluator level C, the evaluator selection information in the content tags is updated to a second evaluation stage because there is the evaluator level B being the next higher level than the evaluator level C. The updated evaluator selection information in the content tag is compared with an evaluator tag and the contents are evaluated by evaluators having the evaluator level B.

Afterwards, when contents from the applicants 6 and 8 are selected based on the evaluation results of the evaluators having the evaluator level B, it is determined whether there is the next higher evaluator level than the evaluator level B. As a result of the determination, there is the evaluator level A being the next higher evaluator level and the evaluator selection information in each of the content tags is updated to a third evaluation stage. The updated evaluator selection information in the content tag is compared with an evaluator tag. And contents are evaluated by evaluators having the corresponding evaluator level A.

When the content from the applicant 6 is selected according to the evaluation result of the evaluators having the evaluator level A, the content evaluation server 100 ends the evaluation procedure because there is no next higher evaluator level than the evaluator level A.

Although the present invention shows and describes exemplary embodiments as discussed above, the present invention is not limited to the embodiments and a person skilled in the art to which the present invention pertains may implement various changes and modifications without departing from the spirit of the present invention.

The invention claimed is:

1. A computer-implemented method for content evaluation using a content evaluation server in a network environment, comprising:
   (a) receiving a content and a content tag from a terminal and storing the content and the content tag; wherein the content tag comprises an evaluator selection information including an evaluation stage information;
   (b) comparing the content tag with evaluator tags of evaluators stored in the content evaluation server, wherein each of the evaluator tags comprises an information of an evaluator level corresponding to an evaluation stage information, and selecting an evaluator tag having the information of the evaluator level in accordance with the evaluator selection information;
   (c) receiving an evaluation result of the content evaluated by an evaluator of the selected evaluator from an evaluator terminal;
   (d) determining whether the content is selected by using the received evaluation result of the content;
   (e) determining whether there is a next higher evaluator level than the evaluator level of the information of the evaluator level of the selected evaluator when the content is selected in the step of (d); and
   (f) updating the evaluation stage information of the selected content in accordance with the next higher evaluator level, and repeating the steps (b)-(e) for a next higher evaluation stage.

2. The computer-implemented method of claim 1, wherein the evaluator selection information in the step (a) further comprises at least one additional feature information for evaluator tag selection and the selection of the evaluator tag in the step (b) is further performed by using the at least one feature information.

3. The computer-implemented method of claim 1, wherein the evaluator selection information in the step (a) further comprises at least one feature information for evaluator tag selection, and the selection of the evaluator tag in the step (b) is further performed by comparing the evaluator tags with the at least one feature information, calculating a matching rate between the evaluator tags and the at least one feature information and selecting the evaluator tag based on the matching rate.

4. The computer-implemented method of claim 1, wherein the evaluator level is adjusted according to an evaluator score calculated by using one or more of an evaluation frequency and an evaluation quality of the evaluator.

5. The computer-implemented method of claim 1, wherein the selection in the step (d) is performed by the evaluation result and at least one of a playing frequency of the content, a favor response for the content and the number of evaluators having evaluated the content.

6. The computer-implemented method of claim 1, wherein the selection in step (d) is performed by evaluating whether the evaluation result satisfies a criterion determined by a threshold value or ranking.

7. The computer-implemented method of claim 1, wherein the evaluator level is classified into region levels.

8. The computer-implemented method of claim 1, wherein the content comprises a plurality of contents and/or the evaluator comprises a plurality of evaluators.

9. A content evaluation server for performing a process for evaluating a content in a network environment, comprising:
   a memory configured to store a program; and
   a processor configured to execute the program,
   wherein the program comprising instructions configured to:
   (a) receive a content and a content tag from a terminal and storing the content and the content tag; wherein the content tag comprises an evaluator selection information including an evaluation stage information,
   (b) compare the content tag with evaluator tags of evaluators stored in the content evaluation server, wherein each of the evaluator tags comprises an information of an evaluator level corresponding to an evaluation stage information, and select an evaluator tag having the information of the evaluator level in accordance with the evaluator selection information,
   (c) receive an evaluation result of the content evaluated by an evaluator of the selected evaluator from an evaluator terminal,
   (d) determine whether the content is selected by using the received evaluation result of the content,
   (e) determine whether there is a next higher evaluator level than the evaluator level of the information of the evaluator level of the selected evaluator when the content is selected in the step of (d), and
   (f) update the evaluation stage information of the selected content in accordance with the next higher evaluator level, and repeating the steps (b)-(e) for a next higher evaluation stage.

10. The content evaluation server of claim 9, wherein the program comprising instructions is further configured to:
   change a evaluator level according to evaluator ranking corresponding to evaluator score, calculate an evaluation quality by comparing the evaluation result evaluated by the evaluator to evaluation result evaluated by one or more different evaluators, and the evaluation quality is reflected to evaluator score.

* * * * *

UNITED STATES PATENT AND TRADEMARK OFFICE
CERTIFICATE OF CORRECTION

PATENT NO. : 10,552,503 B2
APPLICATION NO. : 15/532051
DATED : February 4, 2020
INVENTOR(S) : Sol Jee Chun Page 1 of 1

It is certified that error appears in the above-identified patent and that said Letters Patent is hereby corrected as shown below:

In the Claims

Claim 1, Column 16, Line 44 "the selected evaluator from" should be --the selected evaluator tag from--

Claim 9, Column 18, Line 11 "the selected evaluator from" should be --the selected evaluator tag from--

Signed and Sealed this
Seventh Day of April, 2020

Andrei Iancu
*Director of the United States Patent and Trademark Office*